April 17, 1951  A. S. WYSONG  2,549,277
PISTON CONSTRUCTION
Filed May 10, 1946

INVENTOR.
ANSEL S. WYSONG
BY
H. A. Dreckman
atty.

Patented Apr. 17, 1951

2,549,277

UNITED STATES PATENT OFFICE 2,549,277

PISTON CONSTRUCTION

Ansel S. Wysong, Long Beach, Calif., assignor to Ansel S. Wysong and Joseph M. Maltby, as trustees, jointly and severally, both of Long Beach, Calif.

Application May 10, 1946, Serial No. 668,643

5 Claims. (Cl. 309—7)

This invention relates primarily to a method of pressure lubrication of reciprocating bearing surfaces, such as trunk pistons, crossheads, and the like, and may also be applied to the journals of rotating shafts, such as car axles and other bearings in general use. It is well known that the increased power and speed of modern engines is largely due to pressure lubrication, but this pressure lubrication has not been generally applied to pistons and crossheads because of the complications involved therein. While in the accompanying drawing, I have shown the lubricating method applied to a familiar type of airplane engine piston, I do not wish to limit my invention to the particular form of construction shown.

In ordinary pressure oiling systems, the bearing is closely fitted, and the oil is pumped into the bearing and maintained in a thin film, whereas in the present invention, a pool of lubricant is maintained, which supports a loose fitting piston in proper alignment in the cylinder, and not only lubricates but also compensates for differences in thermal expansion between the piston and the cylinder in which it reciprocates. The effectiveness of the lubricant is in no way affected by changes in viscosity. The lubricant (which may be oil or even water, as used in rubber bearings) is pumped or forced into the space between the bearing or thrust surface of the piston, and the cylinder, by the slightest lateral or transverse movement of the piston as the side thrust of the connecting rod reverses. This pumping action is augmented by the scraping of oil from the walls of the cylinder by the piston rings, and the oil is prevented from escaping under pressure by extensible spring actuated blocks covering the piston pin holes and extending vertically to the upper and lower oil rings. Thus, the piston is divided into two oil pools, one under each side thrust area of the piston. It will be evident that since these oil pools are kept constantly full of oil, no appreciable side movement, known as slapping, can occur, and also regardless of variations of thermal expansion of the piston and cylinder at different temperatures, the space between the piston and the cylinder is always filled with oil. A secondary double oil pool may be provided by special piston rings, as shown herein, and these special rings may be placed either above or below the piston pin, depending on the type of piston used. Most of the wear on engine pistons and cylinders occurs in starting when the oil is too cold to lubricate the pistons properly. In my method of lubrication, there is a sufficient pool of reserve oil held by the piston to lubricate it while the engine warms up until the oil is circulating normally.

One advantage of my invention resides in automatically compensating for differences in the thermal expansion of the piston and cylinder.

Another advantage is the prevention of rocking and slapping of the piston, which causes wearing of the rings and grooves.

Still another object is to prevent scoring and seizing of the piston through metal to metal contact of the bearing surfaces.

Still another object is to provide adequate lubrication when starting a cool engine.

Other objects, advantages and features of invention may appear from the accompanying drawing, the subjoined detailed description and the appended claims.

Figure 1:
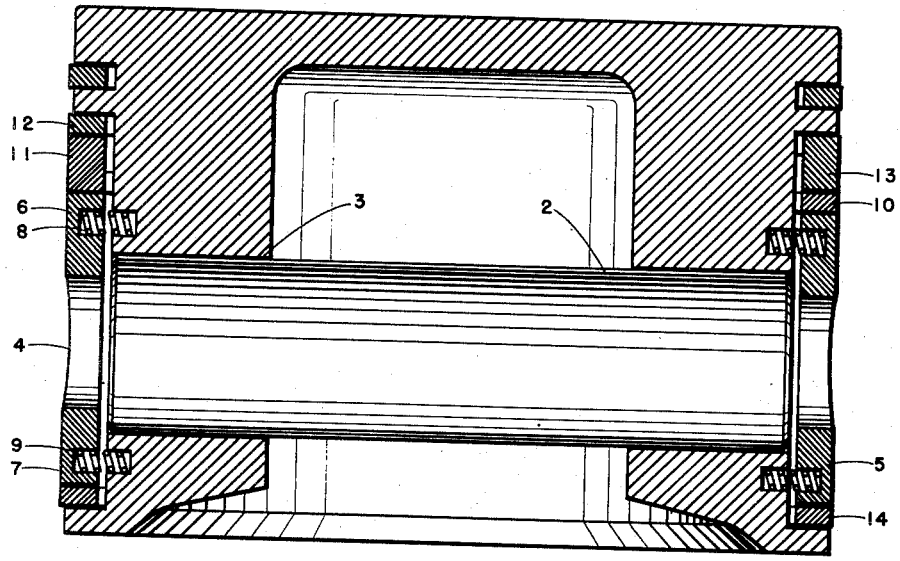
Figure 1 is a transverse sectional view of a piston embodying my construction.

Referring more particularly to the drawing, the numeral 1 indicates a piston, and while I have shown a short truncated type, it is obvious that my construction may be employed on pistons of all designs. The usual piston pin 2 is journaled in aligned holes 3 in the piston, and this construction is usual and well-known. A pair of blocks 4, 5 are fitted one on each side of the piston, and over the holes 3. The purpose of these blocks is to trap or hold a pool of oil on each side of the piston, as will be further described. The blocks also serve to prevent end movement of the pin 2. Each of the blocks 4, 5 include upwardly and downwardly extending fingers 6, 7 respectively. A pair of springs 8, 9 engage each of the blocks 4 and 5, and urge these blocks outwardly against the wall of the cylinder.

Figure 2:
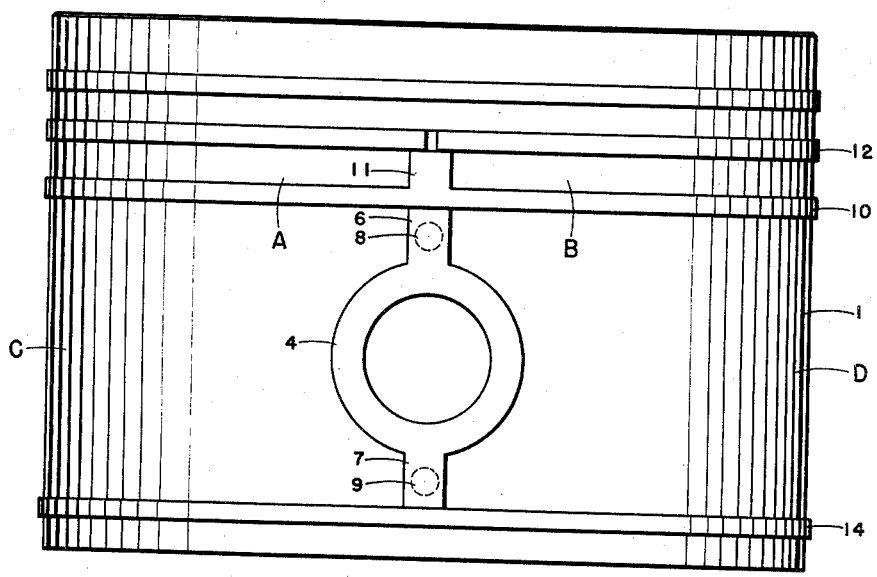
Figure 2 is a side elevation of the same.

An upper piston ring 10 encircles the piston and is engaged by the upper surface of the finger 6. If it is desired to provide a secondary oil pool, the ring 10 may be provided with a projecting lug 11, which engages the adjacent piston ring 12 substantially as shown in Figure 2. The piston ring 12 has a downwardly extending lug 13, and the lugs 11, 13 are spaced 180° apart, thus trapping a pool of oil in two circumferential areas, indicated at A and B. A ring 14 encircles the piston at its lower end and is engaged by the finger 7. Thus two circumferential pools C and D are provided around the piston, each of these pools extending for substantially 180°. Since the blocks 4, 5 and the rings 10, 14 are all engaging the wall of the cylinder, it will be evident that oil is effectively trapped in the two pools C and D. For certain types of heavy duty pistons, it may also be desirable to provide supplemental oil pools, such as A and B. It is obvious that the supplemental oil pools may be provided either above the pools C, D or below them—that is, rings similar to 10 and 12 may be provided either above the piston pin or below it. Also, the pools of oil C and D act as substantially incompressible pads to prevent tilting or slapping of the piston. These pools also serve to lubricate the piston when the engine is cold or when first starting the same.

Having described my invention, I claim:

1. An engine piston which includes: a piston having a plurality of longitudinally spaced piston rings mounted thereon, and a plurality of circumferentially spaced, longitudinally extending slots formed on the exterior face of said piston and extending between the two innermost of said rings; a plurality of oil flow preventing members, with each of said members radially movable in one of said slots; and resilient means at all times urging said members outwardly into contact with the wall of the cylinder in which said piston is situated.

2. An engine piston which includes: a piston having a plurality of longitudinally spaced, circumferentially extending slots formed therein and a plurality of circumferentially spaced, longitudinally extending slots extending between and in communication with the two innermost of said circumferentially extending slots; a plurality of piston rings, with each of said rings mounted in one of said circumferentially extending slots; a plurality of oil flow preventing blocks, with each of said blocks mounted for radial movement in one of said longitudinally extending slots, and the ends of said blocks in contact with said innermost rings; and resilient means urging said blocks outwardly into contact with the walls of said cylinder in which said piston is mounted.

3. In an engine piston, a plurality of longitudinally spaced piston rings mounted thereon, a plurality of circumferentially spaced, longitudinally positioned blocks mounted on the exterior face of said piston and extending between said rings, and pressure means to maintain said blocks in contact with the walls of the cylinder in which said piston is mounted whereby pools of oil are trapped on the exterior face of said piston between said blocks and rings.

4. In an engine piston, a plurality of longitudinally spaced piston rings mounted thereon, a plurality of circumferentially spaced, longitudinally extending blocks mounted on the exterior face of said piston and extending between and in contact with the inner faces of said rings, and spring means urging said blocks outwardly at all times to be in contact with the walls of the cylinder in which said piston is mounted whereby pools of oil are trapped on the exterior face of said piston between said blocks, rings, the exterior face of said piston and said cylinder wall.

5. An oil flow preventing block which includes: an annular ring, and two oppositely disposed fingers extending outwardly from said ring, with the exterior surface of said fingers and ring being formed with a convex surface having substantially the same radius of curvature as the exterior surface of the piston on which said block is to be mounted.

ANSEL S. WYSONG.

REFERENCES CITED

The following references are of record in the file of this patent:

UNITED STATES PATENTS

| Number | Name | Date |
|---|---|---|
| 697,965 | Baldwin | Apr. 22, 1902 |
| 1,373,714 | Calta | Apr. 5, 1921 |
| 1,584,470 | Quintenz | May 11, 1926 |
| 1,595,886 | Smith | Aug. 10, 1926 |
| 1,910,915 | Harrington | May 23, 1933 |
| 2,031,368 | Hodson | Feb. 18, 1936 |
| 2,168,901 | Giardino | Aug. 8, 1939 |
| 2,192,989 | Trigg | Mar. 12, 1940 |

FOREIGN PATENTS

| Number | Country | Date |
|---|---|---|
| 390,560 | Great Britain | Apr. 13, 1933 |